United States Patent [19]

Lüecke et al.

[11] Patent Number: 4,539,388
[45] Date of Patent: Sep. 3, 1985

[54] ACID-MODIFIED, AROMATIC HYDROCARBON RESINS AND METHOD FOR THEIR PRODUCTION

[75] Inventors: Wolfgang Lüecke, Oberhausen; Herbert Beneke, Castrop-Rauxel; Bodo Friedrich, Duisburg, all of Fed. Rep. of Germany

[73] Assignee: Rütgerswerke Aktiengesellschaft, Frankfurt, Fed. Rep. of Germany

[21] Appl. No.: 625,276

[22] Filed: Jun. 27, 1984

[30] Foreign Application Priority Data

Jul. 9, 1983 [DE] Fed. Rep. of Germany ....... 3324817

[51] Int. Cl.$^3$ ................... C08F 240/00; C08F 12/00; C08G 61/02
[52] U.S. Cl. .................... 528/271; 528/489; 528/361; 526/290
[58] Field of Search ................ 528/271, 361; 526/290

[56] References Cited

U.S. PATENT DOCUMENTS 2,833,733  5/1966  Cottrell .................. 528/271
3,494,877  2/1970  Frevel ................... 528/271

FOREIGN PATENT DOCUMENTS 49-15056  4/1974  Japan ................... 528/271
49-15057  4/1974  Japan ................... 528/271

Primary Examiner—C. Warren Ivy
Attorney, Agent, or Firm—Beveridge, DeGrandi & Weilacher

[57] ABSTRACT

Aromatic hydrocarbon resins are disclosed prepared from aromatic, unsaturated hydrocarbons and a melted aromatic carboxylic acid polymerized in the presence of a Friedel-Crafts catalyst. The resin may be used in printing inks, for paper sizing, for coatings and other applications where natural resins have been used.

15 Claims, No Drawings

ACID-MODIFIED, AROMATIC HYDROCARBON RESINS AND METHOD FOR THEIR PRODUCTION

The invention relates to novel aromatic hydrocarbon resins that are soluble in aqueous bases and thus possess properties similar to natural resins. Such resins have found wide application, e.g. in printing inks, in paper sizing, and in the manufacture of aqueous sizing agents or aqueous coating systems, these fields of application having heretofore been reserved for natural resins.

Unfortunately, the availability of natural resins is limited. Moreover, these resins have certain disadvantages, such as sensitivity to oxidation by air or to UV irradiation. The natural resins easily turn yellow and discolor. Furthermore, as with almost all natural products, their quality features vary widely, mainly with regard to color.

Hydrocarbon resins with properties similar to natural resins have been produced in the past by copolymerization of unsaturated hydrocarbons, such as styrene, with aliphatic unsaturated carboxylic acids, especially with maleic acid or maleic acid anhydride. However, these resins have the disadvantage of not being fusible.

Therefore, it is the major object of this invention to prepare fusible hydrocarbon resins that are soluble in aqueous bases and in the most commonly used industrial solvents. Thus, they possess properties similar to natural resins, but have a minimum tendency toward yellowing and sensitivity to oxidation by air and to UV irradiation, and which can be produced without change in quality or color.

This object is achieved by providing aromatic hydrocarbon resins modified with aromatic carboxylic acids and method for producing same as described herein.

The method for producing aromatic hydrocarbon resins modified with aromatic carboxylic acids comprises polymerizing at elevated temperature, as for example 100°–160° C., the aromatic, unsaturated hydrocarbons with a melted aromatic carboxylic acid in the presence of a Friedel-Crafts catalyst. Preferably, the catalyst is added to the molten acid and the unsaturated hydrocarbons are added to the mixture after addition of catalyst is complete. Following the polymerization, an inert organic solvent is preferably added to the reaction mixture and the reaction mixture may be washed with hot water and the washed resin is treated with an aqueous alkali solution for neutralization, whereupon the aqueous phase is isolated and the desired resin set free by acidification.

In a further aspect, the freshly polymerized resin may be washed with hot water and then neutralized with the aqueous alkali solution and the aqueous phase is reacted with water insoluble, resin compatible organic solvent, the desired resin being dissolved in the organic solvent during the acidification.

In another aspect, the resin can be acidified without the use of any solvents, by precipitation as in the examples. However, the use of an inert organic solvent is recommended so that the acidified resin is directly dissolved in the solvent. Styrene is the preferred aromatic, unsaturated hydrocarbon.

In a further detailed aspect of the invention, a fraction of unsaturated, aromatic hydrocarbons boiling in a 140°–220° C. temperature range is charged as the aromatic, unsaturated hydrocarbon for the polymerization process.

It has been found that aromatic carboxylic acids, during the polymerization of unsaturated aromatic hydrocarbons, can be incorporated into the polymers and that the resulting resins have the desired profile of property data.

Suitable aromatic carboxylic acids include, for example, o-, m- or p-toluic acid, phenylacetic acid, cinnamic acid, phenoxyacetic or alkoxybenzoic acid, phthalic acid, terephthalic acid or naphthalenedicarboxylic acids may also be used. Aromatic hydroxycarboxylic acids, such as o-, m- or p-hydroxybenzoic or hydroxynaphthoic acid are particularly suitable, since the additional hydroxyl groups lead to an increase of the hydrophilic properties of the corresponding resins. Both mono and bicyclic aromatic mono and dicarboxylic acids having from 7 to 12 carbon atoms are contemplated; e.g. methyl naphthalene acid or 2,6-naphthalene dicarboxylic acid.

Unsaturated aromatic compounds suited to the production of the resins of the invention are, for example, indene, styrene, methylstyrene, methylindene or vinyltoluene, which can be charged as pure substances or in a mixture. These are monomeric ethylenically unsaturated hydrocarbons that are polymerizable under the conditions of the process; i.e. copolymerizable with aromatic carboxylic acids.

Other polymerizable, aromatic hydrocarbon mixtures that may be used in accordance with the invention include, on the one hand, the products obtained when distilling high temperature coal tar that boils in the 140°–220° C. temperature range, and on the other hand unsaturated, aromatic hydrocarbons formed during the cracking of naphtha or gas oil as well as products obtained when crack residues are subjected to pyrolysis, the concentration thereof being raised in a fraction that boils in the 160°–220° C. temperature range, the so-called resin oil fraction. These fractions contain as unsaturated, aromatic compounds essentially indene, vinyltoluene, methylindene, coumarone, dicyclopentadiene, methyldicyclopentadiene, styrene and α-methylstyrene in a 50–70% concentration, in addition to non-reactive aromatic compounds.

The quantity ratios of the reactants are in the following ranges:

15–50 percent by weight, preferably 35 percent by weight, aromatic carboxylic acids;
85–50 percent by weight, preferably 65 percent by weight, aromatic compounds.

The resins must be prepared according to a process that is modified in respect of that employed in conventional hydrocarbon resin production.

Thus, the aromatic carboxylic acid is introduced into a discontinuously operated stirrer vessel and melted. Since all aromatic carboxylic acids fuse above 100° C. and some of them have high melting points, it is often advisable not to charge the pure acids, but industrial products and mixtures of acids with extremely low melting points. About 10–30 percent by weight (referred to the amount of acid charged) of a Friedel-Crafts catalyst, such as borontrifluoride complexes, aluminum-, antimony-V, or tin-IV-chloride is added to the molten acid with agitation, then, the unsaturated, polymerizable compounds are charged within 40–80 minutes to maintain a 100°–160° C. reaction temperature range.

The addition of the unsaturated compounds is followed by a 10–20 minute secondary reaction at the polymerization temperature. Thereafter, the reaction mixture is washed with hot water to remove unreacted aromatic carboxylic acid and catalyst, the wash water during the washing process having a temperature of at least 80° C. The mild process, which at the same time makes possible an optimum yield of the high quality resin incorporating the invention, resides in diluting the reaction mixture with a water insoluble, resin compatible solvent, such as toluene, and is extracted several times with hot water of at least 80° C. to separate catalyst and unreacted acid.

The dissolved aromatic acid crystallizes almost completely during the cooling of the water and can thus be recovered.

Following this extraction, the organic solution is treated with an aqueous solution of a base such as NaOH, KOH, or $NH_3$. Other suitable alkaline materials may be used. This is necessary in order to separate the alkaline soluble hydrocarbon resin from the undesired alkaline insoluble hydrocarbon resin byproduct. The hydrocarbon resin dissolves in the aqueous phase, while the non-acid modified hydrocarbon resin byproduct remains in the organic solvent phase thereby enabling separation. The aqueous phase is then acidified with a mineral acid and the resin precipitated and isolated.

Here, too, an optimum resin quality can be obtained by mixing the purified, aqueous phase in the volume ratio 1:1 with a water insoluble, resin compatible solvent and acidifying the same with sulphuric acid with agitation. In the process, the alkaline soluble hydrocarbon resin goes over to the organic phase.

The organic phase is isolated and cleaned by washing it twice with water. The last process step resides in distilling off the solvent in vacuo to obtain the base soluble hydrocarbon resin. The base soluble resins so obtained split off $CO_2$ during heating (1 hour at 180°–200° C.), and thus become alkaline insoluble. Their adhesion to widely differing substrates is good and they are soluble in many organic compounds.

The following examples are illustrative of the invention.

EXAMPLE 1

100 g o-hydroxybenzoic acid is introduced into a stirrer vessel and melted. Then, 24.3 g $BF_3 2H_2O$ is added in drops and 188.5 g styrene is added within 45–60 minutes. The reaction temperature is 145° C.

The reaction mixture is then mixed with 300 ml toluene and then the catalyst, as well as unreacted o-hydroxybenzoic acid, is washed out with water.

Thereupon, the desired resin is extracted with aqueous 20% soda lye.

The pure resin is solvent extracted with sulphuric acid by sedimentation, isolation and drying.

Yields:
219.5 g (76%) alkaline soluble, acid modified hydrocarbon resin
37.0 g (13%) styrene resin byproduct
25.5 g ( 9%) unreacted o-hydroxybenzoic acid
6.5 g ( 2%) loss.

Resin properties:
softening point (Kraemer-Sarnow): 30°–40° C.
luminous intensity (brightness): B½
acid value: 160–165
light resistance: turns barely yellow.

Solubilities:
The resins so produced are soluble in the following solvents: toluene, gasoline, cyclohexane, acetone, dioxan, ethanol and aqueous alkali.

Stoving test:
A specimen of the alkaline soluble resin is held at 180° C. for one hour. The resin obtained thereafter has the following properties: softening point: 40°–45° C.

Solubility:
The resins obtained by heating are soluble in the following solvents: toluene, n-hexane, gasoline, cyclohexane, acetone, dioxan, ethanol. They are insoluble in aqueous alkali.

Cross hatch:
Good adhesion of the burned in resin film to glass.

A specimen of the alkaline soluble resin is neutralized with bases.
$NH_3$: 1 g neutralized 23.7 g resin
NaOH: 1 g neutralized 10.1 g resin
KOH: 1 g neutralized 7.2 g resin
(excess of base is not required).

Softening points of the neutralized resin:
Neutralized with
  $NH_3$: 45°–55° C.
  NaOH: 103°–111° C.
  KOH: 60°–68° C.

EXAMPLE 2

100 g o-hydroxybenzoic acid is introduced into a stirrer vessel and melted. 24.3 g $BF_3$ catalyst is then added in drops and a resin oil fraction is added within 60 minutes at 150° C. (boiling range 140°–220° C.) and polymerized and processed as in Example 1.

Yields: 195.7 g alkaline insoluble, acid modified hydrocarbon resin
43.8 g hydrocarbon resin byproduct
28.1 g unreacted o-hydroxybenzoic acid Resin properties:
softening point (Kraemer-Sarnow): 45°–55° C.
luminous intensity (brightness): B3–B6
acid value: 150–155
solubilities: as in Example 1.

EXAMPLE 3

100 g phenoxyacetic acid is introduced into a stirrer vessel and melted.

21.7 g $BF_3 2H_2O$ is then added in drops and 194.5 g styrene is added within 45–60 minutes, the reaction temperature being 120° C. The reaction mixture is then mixed with 250 ml toluene and then the catalyst, as well as unreacted phenoxyacetic acid, is washed out with water.

Thereupon, the desired resin is extracted with aqueous 20% soda lye.

The pure resin is solvent extracted by sedimentation with sulphuric acid, isolation and drying.

Yields:
249.4 g (84.7%) base soluble, acid modified hydrocarbon resin
29.8 g (10.1%) styrene resin byproduct
11.0 g ( 3.7%) unreacted phenoxyacetic acid
4.3 g ( 1.5%) loss.

Resin properties:
softening point (Kraemer-Sarnow): 35°–45° C.
luminous intensity (brightness): B1
acid value: 140–150
light resistance: turns barely yellow
solubilities: as in Example 1.

The resins of the invention include both acid and neutralized resins, and more especially those resins made from 15 to 50 percent by weight aromatic carboxylic acids and 85 to 50 percent by weight of unsaturated aromatic polymerizable compounds. As indicated, the resin may be used for a wide variety of purposes where material resins can be used such as in printing inks, in paper sizing, for coatings and the like.

Further modifications and variations of the invention will become apparent from the foregoing description and are intended to be encompassed by the claims appended hereto.

The German priority application No. P 33 24 817.6 is relied on and incorporated herein by reference.

We claim:

1. An acid modified, aromatic hydrocarbon resin which is the reaction product of an aromatic, unsaturated hydrocarbon with a melted aromatic carboxylic acid in the presence of a Friedel-Crafts catalyst.

2. The aromatic hydrocarbon resin as defined in claim 1 further comprising being made from 15 to 50 percent by weight aromatic carboxylic acid and 85 to 50 percent by weight unsaturated aromatic polymerizable compound.

3. The aromatic hydrocarbon resin as defined in claim 1, wherein the aromatic carboxylic acid is selected from mono and bicyclic aromatic mono and dicarboxylic acids.

4. The aromatic hydrocarbon resin as defined in claim 3, further comprising said acids ranging from 7 to 12 carbon atoms.

5. The aromatic hydrocarbon resin as defined in claim 1, further comprising wherein said hydrocarbon is formed from an unsaturated monomeric hydrocarbon that is copolymerizable with said aromatic carboxylic acid.

6. The aromatic hydrocarbon resin as defined in claim 1, further comprising wherein said hydrocarbon is obtained from the distillation of high temperature coal tar and boil in the range of 140°–220° C.

7. The aromatic hydrocarbon resin as defined in claim 1, further comprising wherein said hydrocarbon is a fraction obtained from the cracking of naphtha or gas oil and boils at 160°–220° C.

8. A method for producing aromatic hydrocarbons modified with aromatic carboxylic acids, comprising polymerizing an aromatic, unsaturated hydrocarbon with a melted aromatic carboxylic acid in the presence of Friedel-Crafts catalyst and at an elevated temperature, following the polymerizing step, washing the reaction mixture with hot water and treating the washed product with an aqueous alkali solution, whereupon the aqueous phase is isolated and obtaining the desired resin product by acidification.

9. The method as set forth in claim 8, further comprising prior to treatment with the aqueous alkali solution, the aqueous phase is reacted with a water insoluble, resin compatible organic solvent, and dissolving the desired resin in the organic solvent during the acidification.

10. The method as set forth in claim 8, further comprising adding styrene as the aromatic, unsaturated hydrocarbon.

11. The method as set forth in claim 8, further comprising adding a fraction of unsaturated, aromatic hydrocarbons boiling in a 140°–220° C. as the aromatic, unsaturated hydrocarbon.

12. A method as set forth in claim 8, further comprising that at 100°–160° C. the aromatic, unsaturated hydrocarbons are dripped into a mixture consisting of melted aromatic carboxylic acid and Friedel-Crafts catalyst and are polymerized, then, followed the polymerization, the reaction mixture is washed with hot water and an inert organic solvent, and treating the product with an aqueous alkali solution, whereupon the aqueous phase is isolated and the desired resin set free by acidification.

13. The method as set forth in claim 12, further comprising prior to the neutralization, the aqueous phase is reacted with a water insoluble, resin compatible inert organic solvent, the desired resin being dissolved in the organic solvent during the acidification.

14. The method as set forth in claim 12, wherein styrene is charged as the aromatic, unsaturated hydrocarbon.

15. The method as set forth in claim 8, further comprising adding a fraction of unsaturated, aromatic hydrocarbon boiling in a 140°–220° C. the aromatic, unsaturated hydrocarbon.

* * * * *